(12) United States Patent
Stephure et al.

(10) Patent No.: US 11,310,348 B2
(45) Date of Patent: Apr. 19, 2022

(54) HIGHLY SCALABLE, FAULT TOLERANT REMOTE ACCESS ARCHITECTURE AND METHOD OF CONNECTING THERETO

(71) Applicant: Calgary Scientific Inc., Calgary (CA)

(72) Inventors: Matthew James Stephure, Toronto (CA); Christopher James Jarabek, Calgary (CA); Cameron Kiddle, Calgary (CA); Jonathan Christopher Neitz, Calgary (CA); Christopher James Garrett, Calgary (CA); Kevin Glen Robinson, Calgary (CA)

(73) Assignee: Calgary Scientific Inc., Calgary (CA)

( * ) Notice: Subject to any disclaimer, the term of this patent is extended or adjusted under 35 U.S.C. 154(b) by 260 days.

(21) Appl. No.: 15/011,183

(22) Filed: Jan. 29, 2016

(65) Prior Publication Data

US 2016/0226871 A1    Aug. 4, 2016

Related U.S. Application Data

(60) Provisional application No. 62/109,914, filed on Jan. 30, 2015.

(51) Int. Cl.
*H04L 29/06*     (2006.01)
*H04L 67/01*     (2022.01)
(Continued)

(52) U.S. Cl.
CPC .............. *H04L 67/42* (2013.01); *H04L 63/08* (2013.01); *H04L 67/02* (2013.01); *H04L 67/101* (2013.01);
(Continued)

(58) Field of Classification Search
CPC ....... H04L 67/42; H04L 63/08; H04L 67/101; H04L 67/146; H04L 67/143; H04L 67/142
See application file for complete search history.

(56) References Cited

U.S. PATENT DOCUMENTS 4,975,690 A    12/1990  Torres
5,345,550 A     9/1994  Bloomfield
(Continued)

FOREIGN PATENT DOCUMENTS

CN    101236553     8/2008
CN    102821413    12/2012
(Continued)

OTHER PUBLICATIONS

United States Court of Appeal for the Federal Circuit, *Affinity Labs of Texas, LLC*, verse *Amazon.com Inc.*, Sep. 23, 2016, pp. 3-5.*
(Continued)

*Primary Examiner* — Ellen Tran
(74) *Attorney, Agent, or Firm* — Meunier Carlin & Curfman LLC (57) ABSTRACT

Systems and methods for providing a remote access to a service in a client-server remote access system. The method includes selecting, by a scheduler, an application server hosting the service, the selecting being performed in accordance with a utilization of resources in the client-server remote access system. A session Uniform Resource Locator (URL) is created that includes a URL payload that uniquely identifies the service and being used to establish the remote access to the service by a client. The system may include a proxy server accessible at a resource URL. The proxy server receives a request from a client to connect to the service. An authentication component authenticates the request in accordance with a payload of the resource URL. A service manager establishes the session between the client and the service connected at the session URL.

21 Claims, 7 Drawing Sheets

(51) Int. Cl.
*H04L 67/02* (2022.01)
*H04L 67/51* (2022.01)
*H04L 67/561* (2022.01)
*H04L 67/101* (2022.01)
*H04L 67/1021* (2022.01)
*H04L 67/146* (2022.01)
*H04L 67/562* (2022.01)
*H04L 67/142* (2022.01)
*H04L 67/1012* (2022.01)
*H04L 67/1008* (2022.01)

(52) U.S. Cl.
CPC ...... *H04L 67/1008* (2013.01); *H04L 67/1012* (2013.01); *H04L 67/1021* (2013.01); *H04L 67/142* (2013.01); *H04L 67/146* (2013.01); *H04L 67/16* (2013.01); *H04L 67/2804* (2013.01); *H04L 67/2809* (2013.01)

(56) References Cited

U.S. PATENT DOCUMENTS

| | | |
|---|---|---|
| 5,555,003 A | 9/1996 | Montgomery et al. |
| 5,742,778 A | 4/1998 | Hao et al. |
| 5,844,553 A | 12/1998 | Hao et al. |
| 5,870,759 A | 2/1999 | Bauer et al. |
| 5,920,311 A | 7/1999 | Anthias |
| 5,978,842 A | 11/1999 | Noble et al. |
| 6,045,048 A | 4/2000 | Wilz et al. |
| 6,061,689 A | 5/2000 | Chang et al. |
| 6,075,531 A | 6/2000 | DeStefano |
| 6,141,698 A | 10/2000 | Krishnan et al. |
| 6,145,098 A | 11/2000 | Nouri et al. |
| 6,175,869 B1* | 1/2001 | Ahuja ............... H04L 67/1008 709/203 |
| 6,253,228 B1 | 6/2001 | Ferris et al. |
| 6,343,313 B1 | 1/2002 | Salesky et al. |
| 6,453,334 B1 | 9/2002 | Vinson et al. |
| 6,453,356 B1 | 9/2002 | Sheard et al. |
| 6,570,563 B1 | 5/2003 | Honda |
| 6,587,880 B1* | 7/2003 | Saigo ............... H04L 63/0815 709/203 |
| 6,601,233 B1 | 7/2003 | Underwood |
| 6,792,607 B1 | 9/2004 | Burd et al. |
| 6,909,545 B2 | 6/2005 | Takano et al. |
| 6,918,113 B2 | 7/2005 | Patel et al. |
| 6,938,096 B1 | 8/2005 | Greschler et al. |
| 6,976,077 B1 | 12/2005 | Lehew et al. |
| 7,065,568 B2 | 6/2006 | Bracewell et al. |
| 7,069,227 B1 | 6/2006 | Lintel, III et al. |
| 7,073,059 B2 | 7/2006 | Worely, Jr. et al. |
| 7,149,761 B2 | 12/2006 | Cooke et al. |
| 7,167,893 B1 | 1/2007 | Malone et al. |
| 7,174,504 B2 | 2/2007 | Tsao |
| 7,181,686 B1 | 2/2007 | Bahrs |
| 7,240,162 B2 | 7/2007 | de Vries |
| 7,246,063 B2 | 7/2007 | James et al. |
| 7,320,131 B1 | 1/2008 | O'Toole, Jr. |
| 7,343,310 B1 | 3/2008 | Stender |
| 7,350,151 B1 | 3/2008 | Nakajima |
| 7,418,711 B1 | 8/2008 | Lee et al. |
| 7,451,196 B1 | 11/2008 | de Vries et al. |
| 7,577,751 B2 | 8/2009 | Vinson et al. |
| 7,620,901 B2 | 11/2009 | Carpenter et al. |
| 7,647,370 B1 | 1/2010 | Liu et al. |
| 7,650,444 B2 | 1/2010 | Dirstine et al. |
| 7,656,799 B2 | 2/2010 | Samuels et al. |
| 7,706,399 B2 | 4/2010 | Janczak |
| 7,725,331 B2 | 5/2010 | Schurenberg et al. |
| 7,802,183 B1 | 9/2010 | Essin |
| 7,831,919 B1 | 11/2010 | Viljoen et al. |
| 7,921,078 B2 | 4/2011 | McCuller |
| 7,941,488 B2 | 5/2011 | Goodman et al. |
| 7,966,572 B2 | 6/2011 | Matthews et al. |
| 8,024,523 B2 | 9/2011 | de Vries et al. |
| 8,125,931 B2* | 2/2012 | Faber ............... H04L 65/103 370/259 |
| 8,261,345 B2 | 9/2012 | Hitomi et al. |
| 8,356,252 B2 | 1/2013 | Raman et al. |
| 8,359,591 B2 | 1/2013 | de Vries et al. |
| 8,509,230 B2 | 8/2013 | Vinson et al. |
| 8,527,706 B2 | 9/2013 | de Vries et al. |
| 8,533,103 B1* | 9/2013 | Certain ............... G06Q 10/06 705/35 |
| 8,572,178 B1 | 10/2013 | Frazzini et al. |
| 8,606,952 B2 | 12/2013 | Pasetto et al. |
| 8,607,158 B2 | 12/2013 | Molander et al. |
| 8,627,081 B2 | 1/2014 | Grimen et al. |
| 8,667,054 B2 | 3/2014 | Tahan |
| 8,832,260 B2 | 9/2014 | Raja et al. |
| 8,924,512 B2 | 12/2014 | Stoyanov et al. |
| 2001/0047393 A1 | 11/2001 | Arner et al. |
| 2002/0032751 A1 | 3/2002 | Bharadwaj |
| 2002/0032804 A1 | 3/2002 | Hunt |
| 2002/0092029 A1 | 7/2002 | Smith |
| 2003/0014735 A1 | 1/2003 | Achlioptas et al. |
| 2003/0023670 A1 | 1/2003 | Walrath |
| 2003/0065738 A1 | 4/2003 | Yang et al. |
| 2003/0120324 A1 | 6/2003 | Osborn et al. |
| 2003/0120762 A1 | 6/2003 | Yepishin et al. |
| 2003/0149941 A1 | 8/2003 | Tsao |
| 2003/0163514 A1 | 8/2003 | Waldschmidt |
| 2003/0184584 A1 | 10/2003 | Vachuska et al. |
| 2003/0208472 A1 | 11/2003 | Pham |
| 2004/0015842 A1 | 1/2004 | Nanivadekar et al. |
| 2004/0029638 A1 | 2/2004 | Hytcheson et al. |
| 2004/0039742 A1 | 2/2004 | Barsness et al. |
| 2004/0068516 A1 | 4/2004 | Lee et al. |
| 2004/0106916 A1 | 6/2004 | Quaid et al. |
| 2004/0117804 A1 | 6/2004 | Scahill et al. |
| 2004/0162876 A1 | 8/2004 | Kohavi |
| 2004/0183827 A1 | 9/2004 | Putterman et al. |
| 2004/0236633 A1 | 11/2004 | Knauerhase et al. |
| 2004/0243919 A1 | 12/2004 | Muresan et al. |
| 2004/0249885 A1 | 12/2004 | Petropoulakis et al. |
| 2005/0005024 A1 | 1/2005 | Samuels et al. |
| 2005/0010871 A1 | 1/2005 | Ruthfield et al. |
| 2005/0021687 A1 | 1/2005 | Anastassopoulos et al. |
| 2005/0050229 A1 | 3/2005 | Comeau et al. |
| 2005/0138631 A1 | 6/2005 | Bellotti et al. |
| 2005/0188046 A1 | 8/2005 | Hickman et al. |
| 2005/0188313 A1 | 8/2005 | Matthews et al. |
| 2005/0216421 A1* | 9/2005 | Barry ............... G06F 11/0709 705/64 |
| 2005/0240906 A1 | 10/2005 | Kinderknecht et al. |
| 2006/0004874 A1 | 1/2006 | Hutcheson et al. |
| 2006/0026006 A1 | 2/2006 | Hindle |
| 2006/0031377 A1 | 2/2006 | Ng et al. |
| 2006/0036770 A1 | 2/2006 | Hosn et al. |
| 2006/0101397 A1 | 5/2006 | Mercer et al. |
| 2006/0130069 A1 | 6/2006 | Srinivasan et al. |
| 2006/0231175 A1 | 10/2006 | Vondracek et al. |
| 2006/0236328 A1 | 10/2006 | DeWitt |
| 2006/0258462 A1 | 11/2006 | Cheng et al. |
| 2006/0265689 A1 | 11/2006 | Kuznetsov et al. |
| 2006/0271563 A1 | 11/2006 | Angelo et al. |
| 2006/0288171 A1 | 12/2006 | Tsien |
| 2006/0294418 A1 | 12/2006 | Fuchs |
| 2007/0024645 A1 | 2/2007 | Purcell et al. |
| 2007/0047535 A1 | 3/2007 | Varma |
| 2007/0067754 A1 | 3/2007 | Chen et al. |
| 2007/0079244 A1 | 4/2007 | Brugiolo |
| 2007/0112880 A1 | 5/2007 | Yang et al. |
| 2007/0120763 A1 | 5/2007 | De Paepe et al. |
| 2007/0130292 A1 | 6/2007 | Tzruya et al. |
| 2007/0136677 A1 | 6/2007 | Agarwal |
| 2007/0203944 A1 | 8/2007 | Batra et al. |
| 2007/0208718 A1 | 9/2007 | Javid et al. |
| 2007/0226636 A1 | 9/2007 | Carpenter et al. |
| 2007/0233706 A1* | 10/2007 | Farber ............... G06F 9/505 |
| 2007/0244990 A1 | 10/2007 | Wells |
| 2007/0256073 A1 | 11/2007 | Troung et al. |
| 2007/0282951 A1 | 12/2007 | Selimis et al. |
| 2008/0134211 A1 | 6/2008 | Cui |

(56) References Cited

U.S. PATENT DOCUMENTS

| | | |
|---|---|---|
| 2008/0146194 A1 | 6/2008 | Yang et al. |
| 2008/0183190 A1 | 7/2008 | Adcox et al. |
| 2008/0313282 A1 | 12/2008 | Warila et al. |
| 2009/0044171 A1 | 2/2009 | Avadhanula |
| 2009/0080523 A1 | 3/2009 | McDowell |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2010/0061238 A1 | 3/2010 | Godbole et al. |
| 2010/0077058 A1 | 3/2010 | Messer |
| 2010/0131591 A1 | 5/2010 | Thomas et al. |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0268813 A1 | 10/2010 | Pahlavan et al. |
| 2011/0138283 A1 | 6/2011 | Marston |
| 2011/0154464 A1* | 6/2011 | Agarwal ............ H04L 63/0815 726/8 |
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0252152 A1 | 10/2011 | Sherry et al. |
| 2012/0030275 A1 | 2/2012 | Boller et al. |
| 2012/0084419 A1 | 4/2012 | Kannan et al. |
| 2012/0084713 A1 | 4/2012 | Desai et al. |
| 2012/0090004 A1 | 4/2012 | Jeong |
| 2012/0133675 A1 | 5/2012 | McDowell |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1 | 9/2012 | Lemire et al. |
| 2012/0324032 A1 | 12/2012 | Chan |
| 2013/0007227 A1 | 1/2013 | Hitomi et al. |
| 2013/0031618 A1 | 1/2013 | Momchilov |
| 2013/0046815 A1 | 2/2013 | Thomas et al. |
| 2013/0046816 A1 | 2/2013 | Thomas et al. |
| 2013/0054679 A1 | 2/2013 | Jooste |
| 2013/0070740 A1 | 3/2013 | Yovin |
| 2013/0086652 A1* | 4/2013 | Kavantzas ............ G06F 21/335 726/5 |
| 2013/0117474 A1 | 5/2013 | Ajanovic et al. |
| 2013/0125226 A1* | 5/2013 | Shah .................. H04L 63/0815 726/7 |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0262566 A1 | 10/2013 | Stephure et al. |
| 2013/0290408 A1 | 10/2013 | Stephure et al. |
| 2013/0346482 A1 | 12/2013 | Holmes |
| 2014/0240524 A1 | 8/2014 | Julia et al. |
| 2014/0298420 A1 | 10/2014 | Barton et al. |
| 2014/0337417 A1 | 11/2014 | Park et al. |
| 2015/0067769 A1 | 3/2015 | Barton et al. |
| 2015/0156133 A1 | 6/2015 | Leitch et al. |
| 2015/0163292 A1 | 6/2015 | Lemire et al. |
| 2015/0319252 A1 | 11/2015 | Momchilov et al. |
| 2016/0054897 A1 | 2/2016 | Holmes et al. |
| 2016/0226979 A1 | 8/2016 | Lancaster et al. |

FOREIGN PATENT DOCUMENTS

| | | |
|---|---|---|
| CN | 103997526 | 8/2014 |
| EP | 0349463 | 1/1990 |
| EP | 1422901 | 5/2004 |
| EP | 2012238 | 1/2009 |
| EP | 2663068 | 11/2013 |
| EP | 2772026 | 9/2014 |
| JP | 2007/084744 | 3/1995 |
| JP | 2002/055870 | 2/2002 |
| JP | 2004-287758 | 10/2004 |
| JP | 2005/031807 | 2/2005 |
| JP | 2008-099055 | 4/2008 |
| JP | 4405812 | 1/2010 |
| JP | 2010-256972 | 11/2010 |
| RU | 2295752 | 3/2007 |
| RU | 2298287 | 4/2007 |
| RU | 2305860 | 9/2007 |
| WO | 1998/058478 | 12/1998 |
| WO | 2001/016724 | 3/2001 |
| WO | 2002/009106 | 1/2002 |
| WO | 2003/032569 | 4/2003 |
| WO | 2003/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 2/2013 |
| WO | 2013/024343 | 2/2013 |
| WO | 2013/070391 | 5/2013 |
| WO | 2013/109984 | 7/2013 |
| WO | 2013/128284 | 9/2013 |
| WO | 2013/153439 | 10/2013 |
| WO | 2015/080845 | 6/2015 |

OTHER PUBLICATIONS

Audun Josan et al., Trust Requirements in Identity Management, 2005, Published by Australasian Information Security Workshop (AISW), pp. 1-10 (Year: 2005).*

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, $5^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

European Search Report, dated Sep. 29, 2015, received in connection with related European Application No. 12824363.1.

European Search Report, dated Sep. 1, 2015, received in connection with related European Application No. 12824077.7.

European Search Report, dated Mar. 3, 2015, received in connection with related European Application No. 09828497.9.

European Search Report, dated Jun. 2, 2014, received in connection with European Application No. 12760310.8.

European Search Report, dated Jul. 5, 2012, received in connection with European Application No. 10738183.2.

Search Report and Written Opinion, dated Nov. 16, 2015, received in connection with SG Application No. 2013087150.

International Search Report, dated Feb. 19, 2010, received in connection with International Patent Application No. PCT/CA2009/001704.

International Preliminary Report on Patentability and Written Opinion, dated May 31, 2011, received in connection with International Patent Application No. PCT/CA2009/001704.

(56) References Cited

OTHER PUBLICATIONS

International Search Report, dated May 12, 2010, received in connection with International Patent Application No. PCT/CA2010/000154.
International Preliminary Report on Patentability and Written Opinion, dated Aug. 9, 2011, received in connection with International Patent Application No. PCT/CA2010/000154.
International Search Report and Written Opinion, dated Jul. 31, 2012, received in connection with International Patent Application No. PCT/IB2012/000562.
International Preliminary Report on Patentability and Written Opinion, dated Sep. 24, 2013, received in connection with International Patent Application No. PCT/CA2010/000562.
International Search Report, dated Dec. 20, 2012, received in connection with International Patent Application No. PCT/IB2012/001589.
International Preliminary Report on Patentability and Written Opinion, dated Feb. 18, 2014, received in connection with International Patent Application No. PCT/IB2012/001589.
International Search Report, dated Dec. 28, 2012, received in connection with International Patent Application No. PCT/IB2012/001590.
International Preliminary Report on Patentability and Written Opinion, dated Feb. 18, 2014, received in connection with International Patent Application No. PCT/IB2012/001590.
International Search Report and Written Opinion, dated Aug. 21, 2013, received in connection with International Patent Application No. PCT/IB2013/000676.
International Preliminary Report on Patentability and Written Opinion, dated Oct. 14, 2014, received in connection with International Patent Application No. PCT/CA2010/000676.
International Search Report and Written Opinion, dated Jul. 31, 2013, received in connection with International Patent Application No. PCT/IB2013/000720.
International Preliminary Report on Patentability and Written Opinion, dated Sep. 2, 2014, received in connection with International Patent Application No. PCT/CA2010/000720.
International Search Report and Written Opinion, dated Mar. 19, 2015, received in connection with International Patent Application No. PCT/US2014/064243.
International Preliminary Report on Patentability and Written Opinion, dated May 31, 2016, received in connection International Patent Application No. PCT/US2014/064243.
International Search Report and Written Opinion, dated Jun. 30, 2016, received in connection International Patent Application No. PCT/IB2016/000277.
Search Report, dated Jul. 12, 2018, received in connection with corresponding EP Patent Application No. 16742846.5.

\* cited by examiner

HIGHLY SCALABLE, FAULT TOLERANT REMOTE ACCESS ARCHITECTURE AND METHOD OF CONNECTING THERETO

CROSS-REFERENCE TO RELATED APPLICATION

This application claims priority to U.S. Provisional Patent Application No. 62/109,914, filed Jan. 30, 2015, entitled "Highly Scalable, Fault Tolerant Remote Access Architecture and Method of Connecting Thereto," the disclosure of which is incorporated herein by reference in its entirety.

BACKGROUND

Ubiquitous remote access to services has become commonplace as a result of the growth and availability of broadband and wireless network access. As such, users are accessing services using an ever-growing variety of client devices (e.g., mobile devices, tablet computing devices, laptop/notebook/desktop computers, etc.) to connect to a wide variety of remote services. A remote server may communicate messages that contain data or other information between the remote services and client devices over diverse networks including, 3G, 4G and LTE mobile data networks, wireless networks such as WiFi and WiMax, wired networks, etc.

Given such growth, there are conditions where the remote access server may not provide enough scalability to service large numbers of concurrent users of the client devices. In addition, there are situations, such as high demand and component failure where the remote access server may crash, disconnecting all of the users connected thereto.

SUMMARY

Disclosed herein are systems and methods for providing a remote access to a service in a client-server remote access system. In accordance with an aspect of the disclosure, a method for providing remote access to a service in a client-server remote access system is disclosed. The method includes selecting, by a scheduler, an application server hosting the service, the selecting being performed in accordance with a utilization of resources in the client-server remote access system; and creating a session URL that includes a URL payload that uniquely identifies the service and being used to establish the remote access to the service by a client.

In accordance with other aspects of the disclosure, a client-server remote access system for providing access to a service is disclosed. The system includes a proxy server accessible at a resource Uniform Resource Locator (URL). The proxy server receives a request from a client to connect to the service. An authentication component authenticates the request in accordance with a payload of the resource URL. A scheduler that selects an application server hosting the service in accordance with a utilization of resources at the client-server remote access system. The scheduler creates a session URL that includes the payload that is used to establish a session between the client and the service. A service manager establishes the session between the client and the service connected at the session URL in accordance with the authenticated request to communicate application data and state information between the client and the service.

In accordance with yet other aspects, a method for enabling remote access to a service in a client-server remote access system is disclosed. The method includes selecting, by a scheduler, an application server hosting the service, the selecting being performed in accordance with a utilization of resources in the client-server remote access system; associating an App ID with the service; creating, by the scheduler, a session Uniform Resource Locator (URL) that includes the App ID as a payload, the session URL identifying the service hosted by the application server; and making the service available to a client at the session URL.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing a highly scalable, fault tolerant remote access architecture and methods for connecting clients to remotely accessed applications and services provided by the remote access architecture, it will become evident to those skilled in the art that the implementations are not limited thereto.

Figure 1:
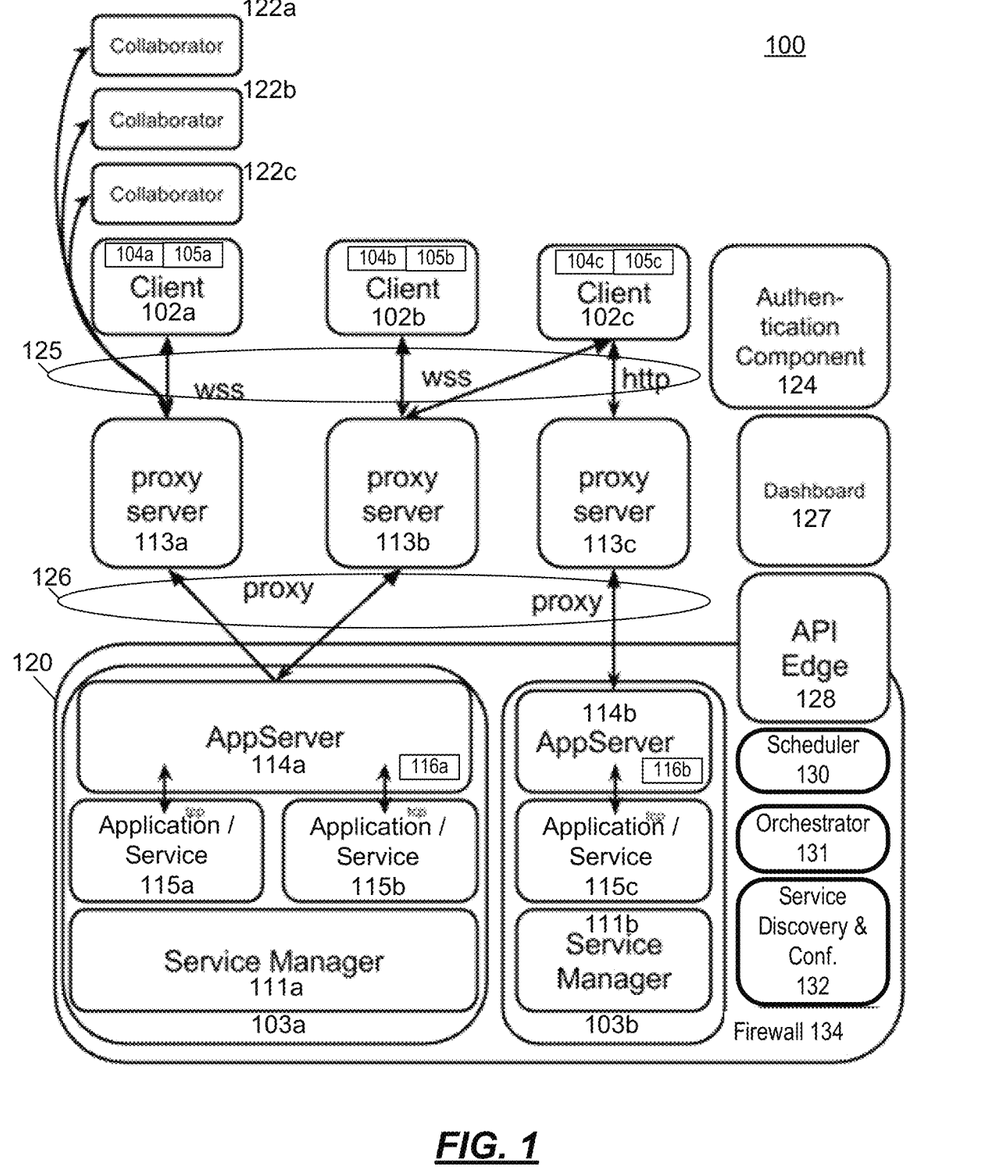
FIG. 1 illustrates an example environment for providing remote access to a service.

With the above overview as an introduction, reference is now made to FIG. 1, which illustrates an example an architecture 100 that provides remote access to services. As shown in FIG. 1, a client device 102a/102b/102c may execute a respective client software development kit (SDK) 104a/104b/104c and a respective client remote access application 105a/105b/105c. The client device 102a/102b/102c may be wireless handheld devices such as, for example, an IPHONE, an ANDROID-based device, a tablet device or a desktop/notebook personal computer that are connected by a communication network 125 to one or more proxy servers 113a/113b/113c.

The client SDK 104a/104b/104c is associated with the respective client remote access application 105a/105b/105c and is adapted to receive the display information from a remote access and application server 103a/103b to which it is connected. The client remote access application 105a/105b/105c may be, e.g., a web browser, dedicated application, etc., that provides a user interface at the client device 102a/102b/102c to display information from a connected service or services, such as one or more of applications 115a/115b/115c. The terms "application" and "service" are used interchangeably herein and refer to a program or group of programs that are delivered over a network to a client device. Example applications, include, but are not limited to, a medical imaging application, a CAD application, a seismographic application, a collaborative whiteboard application, or other.

The communication network 125 may be a 3G, 4G and/or LTE mobile data network, wireless networks such as WiFi and WiMax, or wired networks, etc. Connections over the communication network 125 may be HyperText Transfer Protocol (HTTP), WebSocket Protocol (WSS), or any other protocol supported within a TCP/IP network.

The proxy server 113a/113b/113c may be an HTTP server and reverse proxy server capable of handling a relatively large number of simultaneous requests (e.g., thousands to millions of simultaneous requests). In an implementation, the proxy server 113a/113b/113c executes on a node (e.g., a server computing device) separate from the remote access and application server(s) 103a/103b and is communicatively connected thereto by a communication connection 126. The communication connection 126 may be a higher capacity connection than communication connection 125. The proxy server 113a/113b/113c may also provide for scaling within architecture 100 in accordance with loading, computational cost, geographic location(s) of the remote access and application server 103a/103b, or other factors. An example proxy server 113a/113b/113c is nginx, available from Nginx Inc., San Francisco, Calif.

The remote access and application server 103a/103b may include a service manager 111a/111b, an application server 114a/114b, and one or more applications (services) 115a/115b/115c. In the architecture 100, the service manager 111a/111b is responsible for stopping and starting the applications 115a/115b/115c on a particular remote access and application server 103a/103b. The application server 114a/114b provides for connection marshalling. The application server 114a/114b may include a server SDK 116a/116b that provides display information to the application 115a/115b/115c from the client device 102a/102b/102c and from the application 115a/115b/115c to the client device 115a/115b/115c. An example of the remote access and application server 103a/103b is PUREWEB, available from Calgary Scientific, Inc. of Calgary, Alberta, Canada.

An authentication component 124 may be provided to authenticate users and applications 115a/115b/115c within the architecture 100. In accordance with the security model provided by the architecture 100, none of the applications 115a/115b/115c trust each other until authenticated and granted access by the authentication component 124. The authentication component 124 may use a token-based authentication scheme to provide its services. For example, restricted Uniform Resource Locators (URLs) may be mapped to users once authenticated.

Figure 5A:
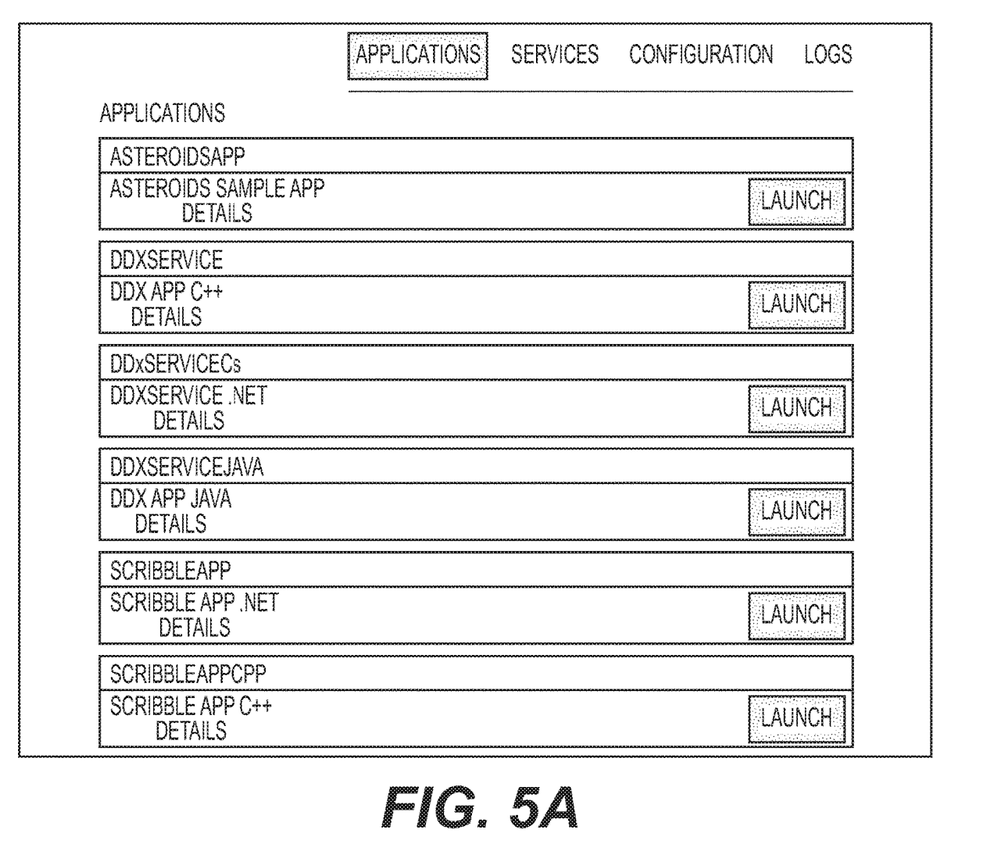
FIGS. 5A, 5B and 5C illustrate example user interfaces presented by a dashboard.
Figure 5B:
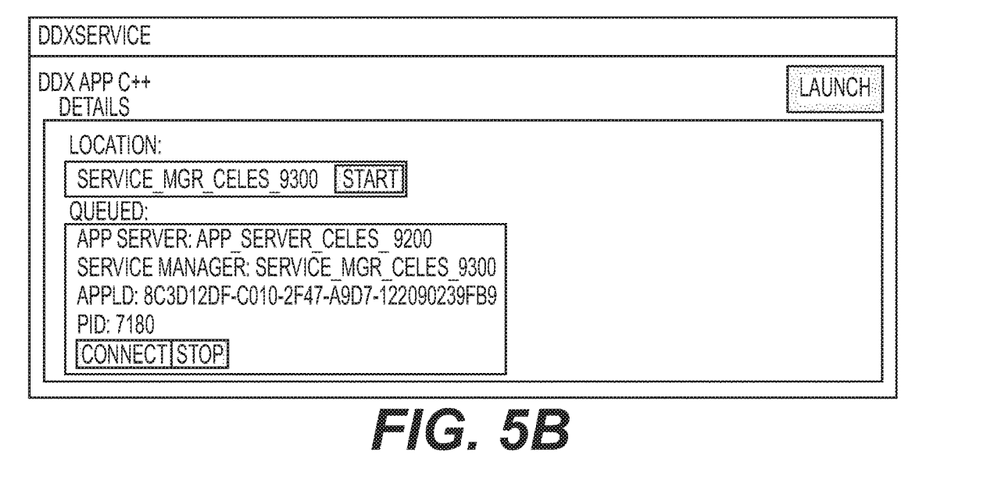
Figure 5C:
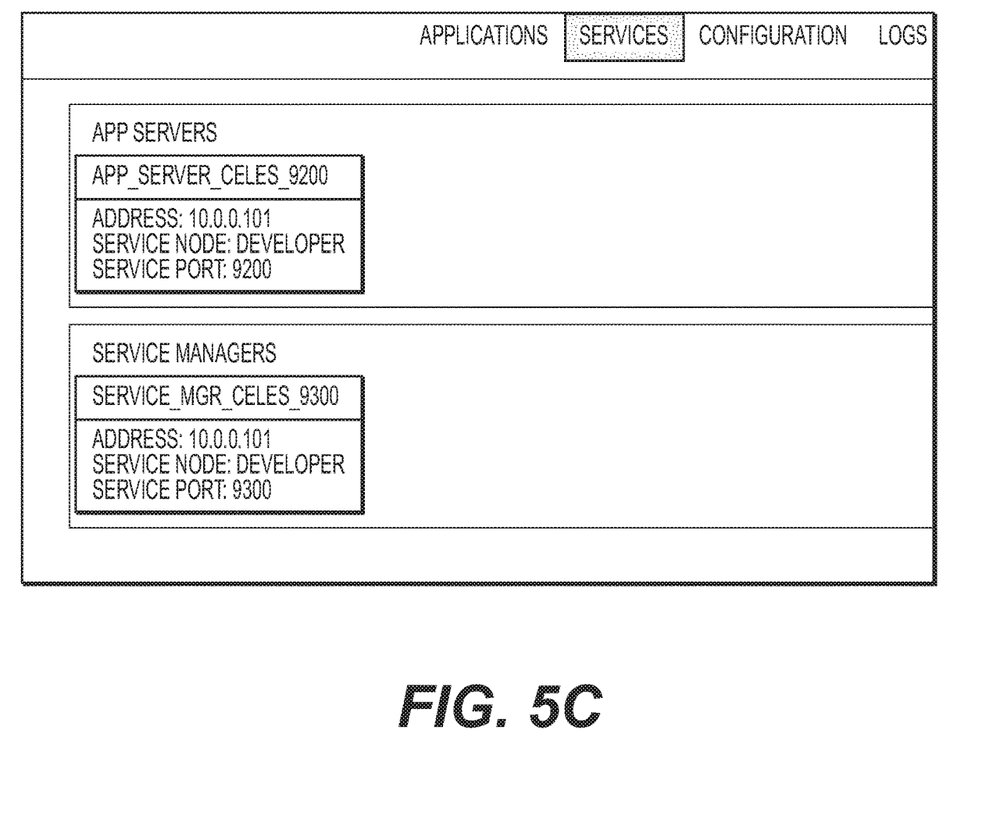

A dashboard 127 provides a system administrator with the ability to launch instances of application servers and to configure components in the architecture 100. Example user interfaces presented by the dashboard are shown in FIGS. 5A, 5B and 5C, which show a user interfaces to launch components within the architecture 100 (FIG. 5A), service information (FIG. 5B), and application server and service manager information (FIG. 5C). Although not shown the dashboard 127 may also reports and metrics regarding performance of a cluster 120.

For example, the scheduler 130 may be provided to manage the utilization of resources, such as application servers 103a/103b or other nodes in the cluster 120. The scheduler 130 may implement one or more selection heuristics to determine which application server 103a/103b to service a remote access connection request. One example heuristic is to choose an application server that is running the fewest number of services (i.e., a lightest load heuristic). Another example heuristic is to choose the longest-running application server that has available capacity (i.e., an oldest with capacity heuristic). This example heuristic attempts to load more services onto fewer, older application servers such that recently created application servers become idle and can be shutdown. Yet another example heuristic accounts from the statefulness of the applications 115a/115b/115c and chooses an application server in accordance with a state of a preexisting running application (e.g., one of applications 115a/115b/115c). For example, an application 115a/115b/115c may have been queued by the application server such that is available to receive a connection from a particular client 102a/102b/102c. Once connected, the particular client 102a/102b/102c remains connected, or will reconnect to the same application 115a/115b/115c. This heuristic may be used in environments where the applications 115a/115b/115c are graphical in nature. In accordance with the above, the scheduler 130 may create session URLs and associated payload (e.g., an App ID that uniquely identifies the application/service) in real-time to direct a user of client device 102a/102b/102c to a service (e.g., 115a) hosted by a particular application server (e.g., 114a). Details of this feature are provided below with reference to FIG. 3.

An orchestrator 131 may start and stop remote access and application servers 103a/103b in accordance with load, hardware capacity (e.g., CPU, GPU, memory), networking requirements, cost, geographic location, or other metrics. The scheduler 130 may deploy the application servers 103a/103b as a cluster 120 behind a firewall 134 associated with an enterprise, cloud services provider, e.g., Amazon Web Services, or other entity. Clustering enables the plural remote access and application servers 103a/103b to provide high availability, load balancing and/or parallel processing. In some implementations, the application servers 103a/103b may be cloud-based instances that are created from images in response to a start command received from the orchestrator 131. For example, there may be a pre-built image associated with each application 115 (or applications) such that the image can be loaded onto an application server when instantiated as, e.g., and instance in a cloud environment.

The orchestrator 131 may operate manually or automatically. When operated manually, a user remotely connects using a command line interfaces (e.g., on a client computing device associated with a developer) to the orchestrator 131, and turns on or off application servers using. When operated automatically, the orchestrator 131 may receive information from the scheduler 130 about current resource allocation within the cluster 120. If resource utilization within the cluster 120 or on a particular application server 103a or 103b is high, then the orchestrator 131 may automatically start a new application server instance or instances to meet demand. Similarly, if utilization within the cluster 120 or on a particular application server 103a or 103b is low, then the orchestrator 131 may automatically stop an existing application server instance.

Further, the orchestrator 131 may deploy additional proxy servers 113a/113b/113c (on additional nodes or a same node, as resources permit) to handle connections to the remote access and application servers 103a/103b in the cluster 120.

Alternatively, additional remote access and application servers 103a/103b may be deployed on additional or same nodes as other remote access and application servers 103a/103b.

The service discovery and configuration component 132 may provide discovery services within the cluster 120. The service discovery and configuration component 132 is adapted to determine which resources that an application 115a/115b/115c may require, and to make the applications 115a/115b/115c accessible to the remote clients 102a/102b/102c. For example, the service discovery and configuration component 132 may provide Domain Name Services (DNS) for routing requests from the proxy servers 113a/113b/113c to an application 115a/115b/115c. An example of the service discovery and configuration component 132 is Consul, available from HashiCorp.

An API Edge 128 may be provided to interface with the dashboard 127 and other external components to obtain information from, or provide information to, components in the cluster 120, such as the scheduler 130 and service discovery and configuration component 132.

Figure 6:
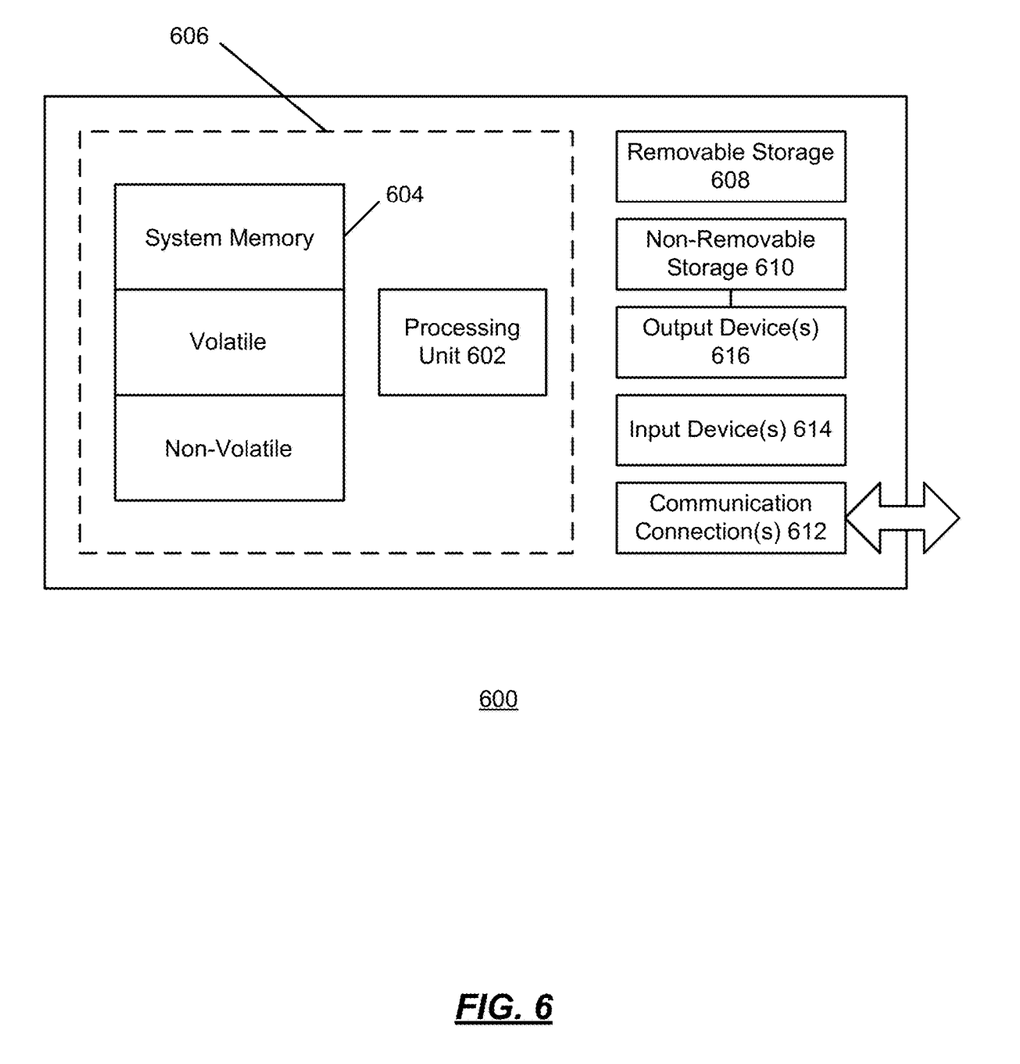
FIG. 6 illustrates an example computing device.

In some implementations, one or more components of the cluster 120, the proxy servers 113a/113b/113c, the authentication component 124 or the dashboard 127 may be deployed within a cloud infrastructure, such as, but not limited to, Amazon Web Services (AWS). An example of the client device 102a/102b/102c and the remote access and application server 103a/103b is shown in FIG. 6. Still further, one or more of the components within the architecture 100 may be deployed as a micro service to enhance the scalability and fault tolerance of the architecture 100. Thus, the architecture 100 provides a highly scalable, fault tolerant architecture in which large numbers of clients may remotely access applications over a network.

Figure 2:
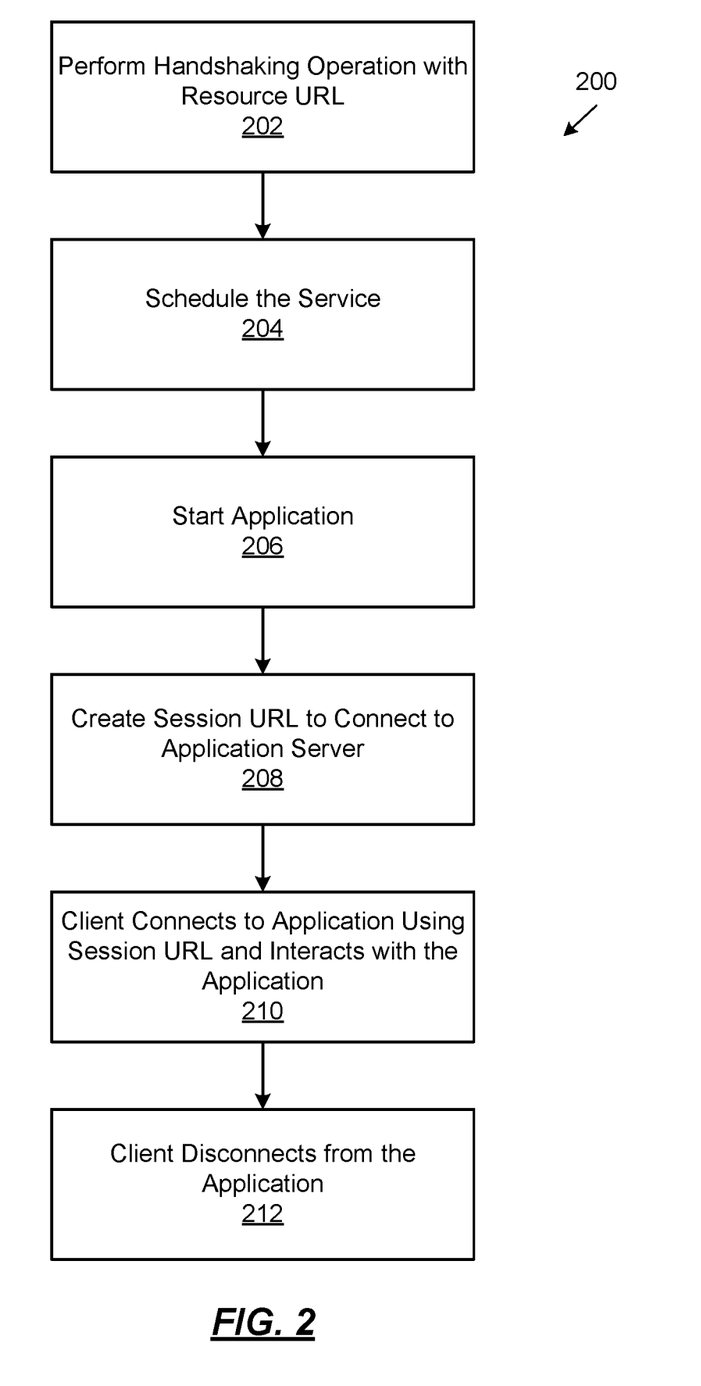
FIG. 2 illustrates an operational flow illustrating a client device making a request using a resource URL and connecting to, and disconnecting from, an application using a session URL within the example environment of FIG. 1.
Figure 3:
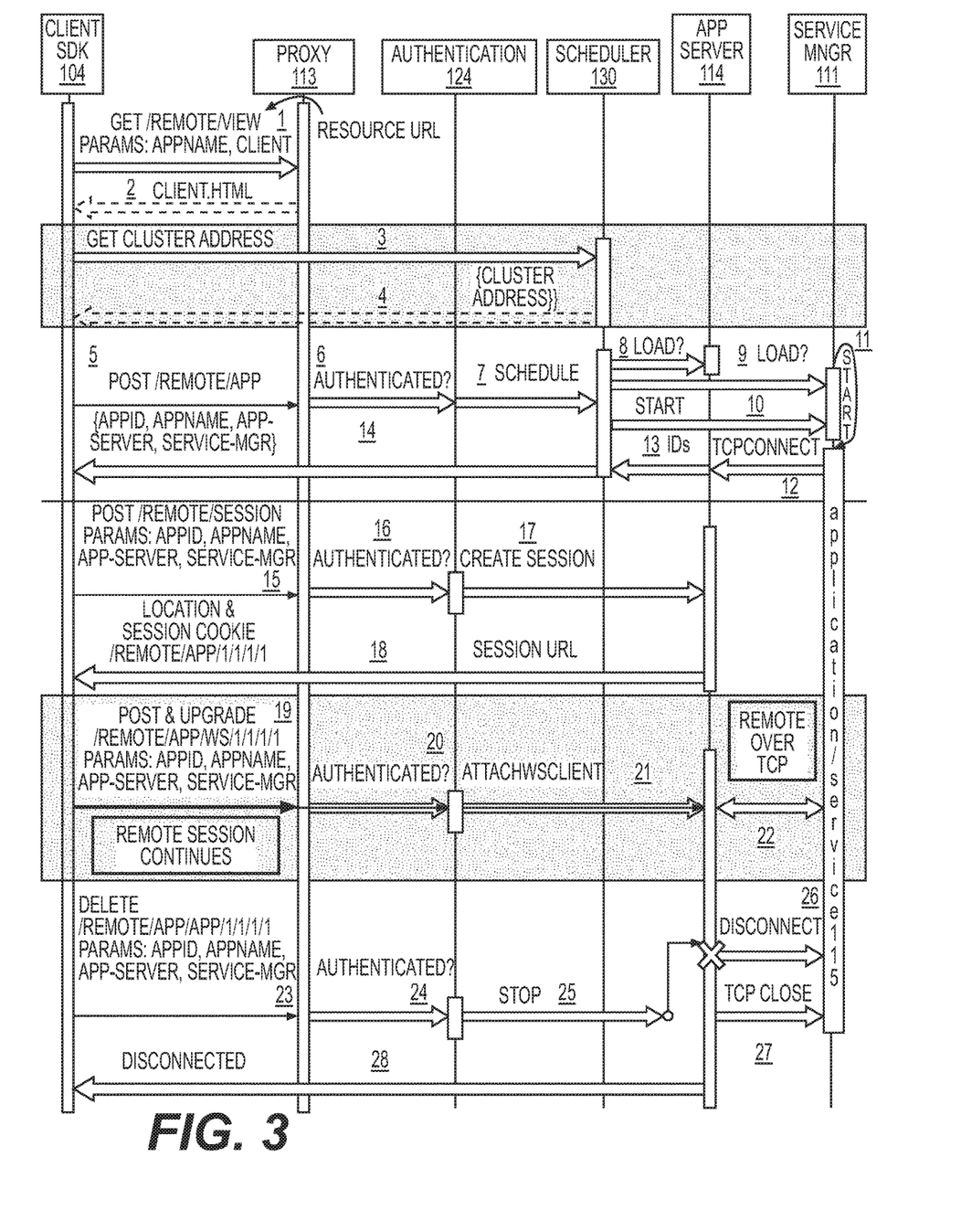
FIG. 3 illustrates a call flow diagram illustrating a sequence of messages that are communicated between components when performing the operational flow of FIG. 2.

With reference to FIGS. 2 and 3, there is illustrated an operational flowchart and call flow diagram illustrating an example flow and sequence of messages that are sent between components in the architecture 100. With reference With reference to FIG. 2, at 202, a handshake operation is performed between the client and the proxy server. The handshake operation may entail downloading JavaScript files from, e.g., the proxy server 113a to the client 102a that are executed with a browser of the client 102a as the client remote access application 105a. As shown in FIG. 3, the call flows associated with operation performed at 202 are generally shown by flows 1 and 2. The client SDK 104a/104b/104c connects to the proxy server 113a/113b/113c, and using, e.g. an HTTP GET method, receives a resource URL and parameters associated with application 115a/115b/115c. The parameters may include an application name, and a client identifier (flow 1). The proxy server 113a/113b/113c returns, e.g., JavaScript that executes as the client remote access application 105a/105b/105c to the client SDK 104a/104b/104c (flow 2).

At 204, a service is scheduled. For example, using the application name passed in flow 1, the scheduler 130 may request that the service manager 111a start the application 115a to fulfill a client request associated with the resource URL. The call flows associated with the operation performed at 204 are generally shown by flows 3 and 4 in FIG. 3. The client SDK 104a/104b/104c obtains a cluster address from the scheduler 130 of the application server 114a/114b associated with the application 115a/115b/115c to be used (flow 3). The scheduler 130 returns the cluster address to the client SDK 104a/104b/104c (flow 4).

At 206, the application that is the subject of the resource URL is started. The scheduler 130 checks resource utilization on the application server 114a and, depending on load, etc., contacts the service manager 111a to start the application 115a. The call flows associated with the operation performed at 206 are generally shown by flows 5 through 14 in FIG. 3. The client SDK 104a/104b/104c connects to the proxy server 113a/113b/113c located at the resource URL (e.g., /remote/app, in flow 5). For example, the client SDK 104a/104b/104c may connect to the proxy server 113a/113b/113c and send a request using an HTTP POST method together with the payload that includes authentication information about the e.g., the user or the client device 102a/102b/102c.

The authentication information is provided to the authentication component 124 to determine if the user or client device 102a/102b/102c is authorized (or remains authorized) to access the application 115a/115b/115c (flow 6). If authentication passes, then the authentication component 124 makes a request to the scheduler 130 (flow 7), which then contacts the applications server 114a/114b (flow 8) to determine a load at the remote access and application server 103a/103b on which the application 115a/115b/115c executes. The service manager 111a/111b of the remote access and application server 103a/103b makes the determination (flow 9), and if the load is beyond a threshold amount or the application 115a/115b/115c is not running, then the scheduler 130 sends a Start message to the service manager 111a/111b (flow 10) to start the application 115a/115b/115c (flow 11). For example, the service manager 111a connects to and starts the application 115a using the App ID. The service manager 111a establishes a "session" associated with the application 115a, which is then considered to be "a queued service" to which a client device may remotely connect. The queued service may be known by a unique application name (for a single type of remotely accessible application) and/or the App ID that is unique to the queued service connection.

Next, the application 115a/115b/115c begins the start-up process, as described above, and connects to the application server 114a/114b using, e.g., a TCP Connect message (flow 12). The application 115a/115b/115c provides identification information (e.g., App ID, application name, and a server instance identifier, a service manager identifier), which is passed to the scheduler 130 (flow 13). The scheduler 130 then communicates the identification information to the client SDK 104a/104b/104c (flow 14).

Returning to FIG. 2, at 208, a session URL is created to make the service available at the application server. The authentication component 124 creates a session and the application server 114a returns the session URL to the client SDK 104. The call flows associated with the operation performed at 208 are generally shown by flows 15 through 18 in FIG. 3. Using the above-noted parameters, the client SDK 104a/104b/104c may use, e.g., an HTTP POST method together with the parameters to make a request to the proxy server 113a/113b/113c (flow 15), which passes the request to authentication component 124 (flow 16) to again determine if the client device 102a/102b/102c is authorized to access the application 115a/115b/115c identified by the parameters. If authenticated, the authentication component 124 sends a CreateSession message to the application server 114a/114b (flow 17). The application server 114a/114b returns a location of the application 115a/115b/115c together with a session cookie to the client SDK 104a/104b/104c (flow 18). Thus, a session is created and the client SDK is ready to attach to the service.

At 210, the client interacts with the application. The call flows associated with the operation performed at 210 are generally shown by flows 19 through 22 in FIG. 3. The client device 102a may connect to a specific instance of a queued service (i.e., the application 115a) using the App ID. The client SDK 104a connects to the application 115a using the session URL, which includes a payload that is used for authentication of the client 102a. Once the client 102a is connected, the application 115a is upgraded to an "active service." Additional clients may connect to the active services by using the unique App ID whereby the connected clients may collaborate together with the active service, the details of which follow below. In particular, a client device (e.g., 102a) may collaborate with other client devices (e.g., 102b and/or 102c) in a collaboration session. For example, collaborators 122a/122b/122c may work together with client device 102a/102b/102c in a collaborative session to share, e.g., application 115a/115b/115c. The collaborators 122a/122b/122c and client device 102a/102b/102c may share resource such as the application 115a or data using , for example, via shared application state and message passing. Additional details of collaboration are described with reference to FIG. 4.

The call flows associated with the operation performed at 210 are generally shown by flows 19 through 22 in FIG. 3. Using the location information and parameters in the session URL, the client SDK 104a/104b/104c sends a request, e.g., as an HTTP POST method, to the proxy server 113a/113b/113c (flow 19), which is passed again to the authentication component 124 (flow 20). If authenticated, the authentication component 124 communicates an AttachClient message to the application server 114a/114b (flow 21) to communicatively connect the application 115a/115b/115c to the client device 102a/102b/102c in a remote access session. The application 115a/115b/115c is now communicatively connected to the client SDK 104a/104b/104c by, e.g., a Web Socket connection (Flow 22) formed between the application server 114a/114b and the client device 102a/102b/102c via the proxy server 113a/113b/113c, as shown in FIG. 1. As such, image data, application state information, or other data associated with the remote session may be transmitted between the application 115a/115b/115c and the client device 102a/102b/102c.

Application state information may be communicated during the remote session in a state model and is information concerning the remotely-accessed application 115a/115b/115c and/or session information concerning the client device 102a/102b/102c or client devices 102a/102b/102c that may be participating in a collaborative session. In particular, the state model may be contain changes to the application state and may be communicated between the application server 114a/114b and the client device 102a/102b/102c, or client devices 102a/102b/102c if more than one client device 102a/102b/102c are in a collaboration session. The state model can be represented by, e.g., an Extensible Markup Language (XML) document. It should be understood that other representations of the state model can be used.

In FIG. 2, at 212, the client disconnects from the application. The client SDK 104a sends a stop message to the application server 114a, which disconnects from the service manager 111a and closes the connection between the client 102a and the application 115a. The call flows associated with the operation performed at 212 are generally shown by flows 23 through 28 in FIG. 3. When a user at the client device 102a/102b/102c desires to end the remote session and disconnect from the application 115a/115b/115c, a request may be made using, e.g., a web socket close or HTTP DELETE method, which is communicated to the proxy server 113a/113b/113c (flow 23), which passes the request as an authentication request the authentication component 124 (flow 24). Once authenticated, a Stop message is communicated to the application server 114a/114b (flow 25) which then communicates a TCP Disconnect (flow 26) and a TCP Close (flow 27) message to the application 115a/115b/115c. The application server 114a/114b then sends a Disconnect message to the client SDK 104a/104b/104c ending the session with the application 115a/115b/115c. The application server 114a/114b then sends a Disconnect message to the client SDK 104a/104b/104c ending the session with the application 115a/115b/115c (flow 28).

While the above operational and call flow diagrams provide example flows to connect and disconnect a client device 102a/102b/102c from a remote application 115a/115b/115c within the architecture 100, other variations and call flows will be evident to one of ordinary skill in the art.

Figure 4:
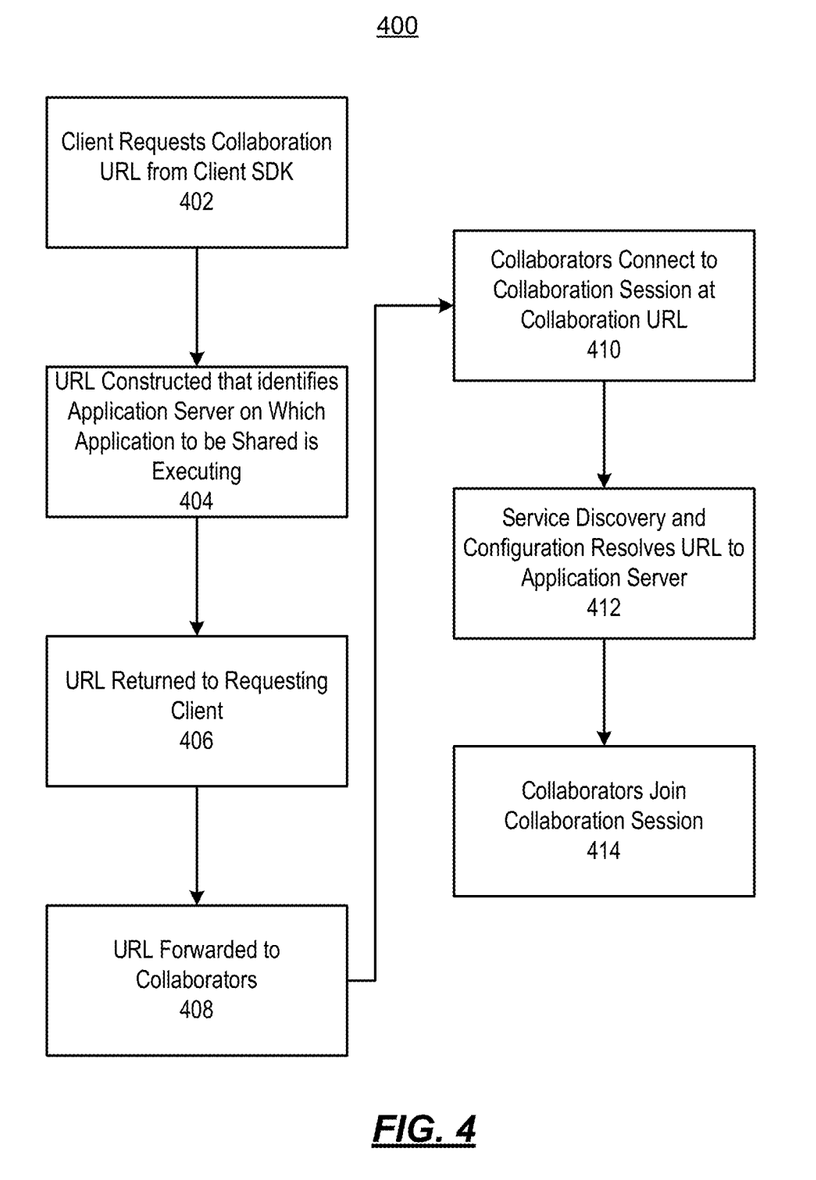
FIG. 4 illustrates an operational flow for creating a collaboration URL to establish a collaboration session between collaborators and/or clients.

FIG. 4 illustrates an example operational flow 400 to initiate a collaboration session in the architecture 100 of the present disclosure. At 402, a client requests a collaboration URL from the client SDK. For example, a user at the client 102a may request the collaboration URL from client SDK 104a to enable other collaborators 122a/122b/122c or clients 102b/102c to connect to the collaboration session whereby each can collaboratively interact with, e.g., application 115a. At 404, the collaboration URL is constructed that identifies the application server on which the application be shared is executing. For example, the collaboration URL may be constructed by the authentication service 124 in such a way that it uniquely identifies the application server 114a behind the proxy server 113a.

At 406, the collaboration URL is returned to the requesting client. At 408, the user at the requesting client (e.g., 102a) may forward the collaboration URL to one or more of the collaborators 122a/122b/122c or clients 102b/102c. At 410, the collaborators or other clients connect to the collaboration session using the collaboration URL. At 412, the service discovery configuration component resolves the collaboration URL to the application server 114a. The service discovery and configuration component 132 may use DNS to perform location services. At 414, the collaborators join the collaboration session such that they each interact with the application 115a.

Thus, the operational flow 400 provides for a method to allow multiple users to collaboratively interact with application executing within the architecture 100.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of tangible computer readable media. Computer readable media can be any available tangible media that can be accessed by device 600 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing remote access to a service in a client-server remote access system, comprising:
   receiving, at a proxy server, a request from a client to remotely access the service at a resource URL, the request including an application name and a client identifier;
   authenticating the client in accordance with the client identifier to establish a trust between the client and the service;
   in response to an authenticated request, selecting, by a scheduler, an application server hosting the service, wherein the scheduler implements one or more selection heuristics to determine which application server to service a remote access connection request,
   the selection heuristics consisting of:
      choosing the application server running the fewest number of services or has the lightest load;
      choosing the longest-running application server that has availability in order to allow unused application servers to be shut down when not being utilized;
      choosing the application server in accordance with the state of a. preexisting running application, therefore clients will reconnect to previously used application server;
   creating a session uniform resource locator (URL) that includes a URL payload that uniquely identifies the service hosted on the selected application server; and
   establishing a remote access session between the client and the selected application server using the session URI., and by passing the URI, payload as a parameter, wherein application data and state information about the running application are communicated between the client and the application server during the remote access session to provide the client remote access to the service.

2. The method of claim 1, further comprising creating the resource URL prior to the selection of the application server.

3. The method of claim 1, wherein the URL payload that uniquely identifies the service is an App ID.

4. The method of claim 1, further comprising:
   providing a collaboration URL by the authentication component to the client;
   receiving a second request at the proxy server from a second client using the collaboration URL; and
   joining the second client to the remote access session.

5. The method of claim 4, wherein the collaboration URL identifies the selected application server and authenticates the second client.

6. The method of claim 1, wherein the session URL is mapped to a user associated with the client.

7. The method of claim 1, further comprising managing resource utilization within the client-server remote access system using the scheduler.

8. The method of claim 7, wherein the scheduler chooses the application server based on the application server running a fewest number of services.

9. The method of claim 7, wherein the scheduler chooses the application server based on the application server being a longest-running application server having available capacity.

10. The method of claim 7, wherein the scheduler chooses the application server based on a state of a preexisting running service on the application server.

11. The method of claim 7, wherein the scheduler creates the session URL in real-time to direct the client to the application server hosting the service.

12. The method of claim 7, further comprising providing an orchestrator that starts and stops application servers within the client-server remote access system in accordance with one of load, hardware capacity (e.g., CPU, GPU, memory), networking requirements, cost, or geographic location.

13. The method of claim 12, further comprising providing information from the scheduler to the orchestrator receives about current resource allocation to automatically start or stop the application server based on demand.

14. A client-server remote access system for providing access to a service, comprising:
a proxy server accessible at a resource Uniform Resource Locator (URL), the proxy server receiving a request from a client to connect to the service, the request including an application name and a client identifier;
an authentication component that authenticates the request in accordance with the client identifier to establish a trust between the client and the service;
a scheduler that selects an application server hosting the service in accordance with one or more selection heuristics that consist of:
choosing the application server running the fewest number of services or has the lightest load;
choosing the longest-running application server that has availability in order to allow unused application servers to be shut down when not being utilized;
choosing the application server in accordance with the state of a. preexisting running application, therefore clients will reconnect to previously used application server;
the scheduler creating a session URL that includes the payload that is used to establish a remote access session between the client and the selected application server; and
a service manager that establishes the remote access session between the client and the selected application server connected at the session URL in accordance with the authenticated request and the payload, which is passed as a parameter to the authentication component,
wherein application data and state information about the running application are communicated between the client and the selected application server during the remote access session.

15. The client-server remote access system of claim 14, wherein a collaboration URL is provided by the authentication component to the client, wherein a second request is received at the proxy server from a second client using the collaboration URL, and wherein the second client is joined to the session.

16. The client-server remote access system of claim 15, wherein the collaboration URL identifies the application server and authenticates the second client.

17. The client-server remote access system of claim 14, wherein resource utilization within the client-server remote access system is managed using the scheduler, and wherein the scheduler chooses the application server based on the application server running a fewest number of services, or chooses the application server based on the application server being a longest-running application server having available capacity, or chooses the application server based on a state of a preexisting running service on the application server.

18. The client-server remote access system of claim 14, wherein a collaboration URL is provided by the authentication component to the client, the collaboration URL containing a payload parameter to identify the application server wherein a second request is received at the proxy server from a second client using the collaboration URL, and wherein the second client is joined to the session.

19. The client-server remote access system of claim 18, wherein the collaboration URL authenticates the second client.

20. The client-server remote access system of claim 14, wherein the scheduler chooses the application server based on one of the following criteria: selecting the application server running a fewest number of services, selecting the application server based on the application server being a longest-running application server having available capacity, or selecting the application server based on a state of a preexisting running service on the application server.

21. The client-server remote access system of claim 14, wherein the application server creates the session URL in real-time to when making the service available to the client.

* * * * *